US010073323B2

(12) United States Patent
Launi

(10) Patent No.: US 10,073,323 B2
(45) Date of Patent: Sep. 11, 2018

(54) HOLDER FOR A MOBILE DEVICE TO CAPTURE IMAGES

(71) Applicant: Enrique Launi, Montreal-Ouest (CA)

(72) Inventor: Enrique Launi, Montreal-Ouest (CA)

(*) Notice: Subject to any disclaimer, the term of this patent is extended or adjusted under 35 U.S.C. 154(b) by 0 days.

(21) Appl. No.: 14/777,028

(22) PCT Filed: Mar. 17, 2014

(86) PCT No.: PCT/CA2014/050274
§ 371 (c)(1),
(2) Date: Sep. 15, 2015

(87) PCT Pub. No.: WO2014/139026
PCT Pub. Date: Sep. 18, 2014

(65) Prior Publication Data
US 2016/0041455 A1 Feb. 11, 2016

Related U.S. Application Data

(60) Provisional application No. 61/804,356, filed on Mar. 22, 2013, provisional application No. 61/787,553, filed on Mar. 15, 2013.

(51) Int. Cl.
G03B 11/04 (2006.01)
G03B 17/56 (2006.01)
(Continued)

(52) U.S. Cl.
CPC ........... *G03B 11/046* (2013.01); *F16M 13/04* (2013.01); *G03B 17/563* (2013.01);
(Continued)

(58) Field of Classification Search
None
See application file for complete search history.

(56) References Cited

U.S. PATENT DOCUMENTS 817,207 A 4/1906 Wheeler
2,369,829 A 2/1945 Johnson
(Continued)

FOREIGN PATENT DOCUMENTS

WO 9941540 A2 8/1999

OTHER PUBLICATIONS

Written Opinion for PCT/CA2014/050274; dated Jun. 9, 2014; 4 pgs.

*Primary Examiner* — Justin P Misleh
(74) *Attorney, Agent, or Firm* — Gonzalo Lavin

(57) ABSTRACT

A holder for maintaining a mobile device having a screen in a fixed position when used by a user to capture images. The holder includes an elongated hollow cover section for being held by a hand of the user, the cover section comprising a viewer end and an opposed device end, the viewer end being configured for being held near an eye of the user so as to permit the user to view the screen of the mobile device therethrough. A mobile device support section supports the mobile device, the support section being mounted adjacent to the device end of the cover section, the support section being positioned, shaped, and sized for maintaining the mobile device in the fixed position such that the user can stably view the screen of the mobile device through the view end of the cover section, thereby allowing the user to capture images.

19 Claims, 16 Drawing Sheets

(51) Int. Cl.
*F16M 13/04* (2006.01)
*H04N 5/225* (2006.01)
(52) U.S. Cl.
CPC ......... *G03B 17/566* (2013.01); *H04N 5/2252* (2013.01); *G03B 17/565* (2013.01)

(56) References Cited

U.S. PATENT DOCUMENTS

| | | |
|---|---|---|
| 2,651,981 A | 9/1953 | Calhoun |
| 3,966,101 A | 6/1976 | Taylor, III |
| 4,244,500 A | 1/1981 | Fournier |
| 4,963,904 A | 10/1990 | Lee |
| 5,073,788 A | 12/1991 | Lingwall |
| 5,397,041 A | 3/1995 | Bruseker |
| 6,929,409 B2 | 8/2005 | DeSorbo et al. |
| 8,303,123 B2 | 11/2012 | Kory |
| 2008/0030868 A1* | 2/2008 | Schmidt ................ G02B 7/022 359/643 |
| 2008/0239142 A1* | 10/2008 | Suzuki ................. G03B 17/02 348/376 |
| 2009/0135091 A1* | 5/2009 | McDonough ........... G09F 19/12 345/7 |
| 2010/0277575 A1 | 11/2010 | Ismael et al. |
| 2011/0032415 A1 | 2/2011 | Sadowski |
| 2011/0102659 A1* | 5/2011 | Maekawa ............ H04N 5/2251 348/333.06 |
| 2012/0046100 A1* | 2/2012 | Roman ................... F41G 1/467 463/30 |
| 2012/0320340 A1 | 12/2012 | Coleman, III |
| 2013/0094849 A1* | 4/2013 | Schmidt ............... G03B 17/565 396/544 |
| 2013/0222668 A1* | 8/2013 | Anderson .......... H04N 5/23293 348/333.08 |
| 2013/0229716 A1* | 9/2013 | Thomas ................... F41G 3/02 359/633 |
| 2014/0093229 A1* | 4/2014 | Lecuna Aguerrevere .................... F16M 11/048 396/420 |
| 2014/0226055 A1* | 8/2014 | Schmidt ................ G03B 13/02 348/333.09 |

* cited by examiner

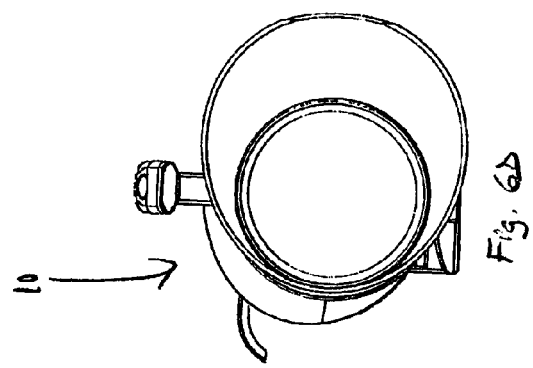
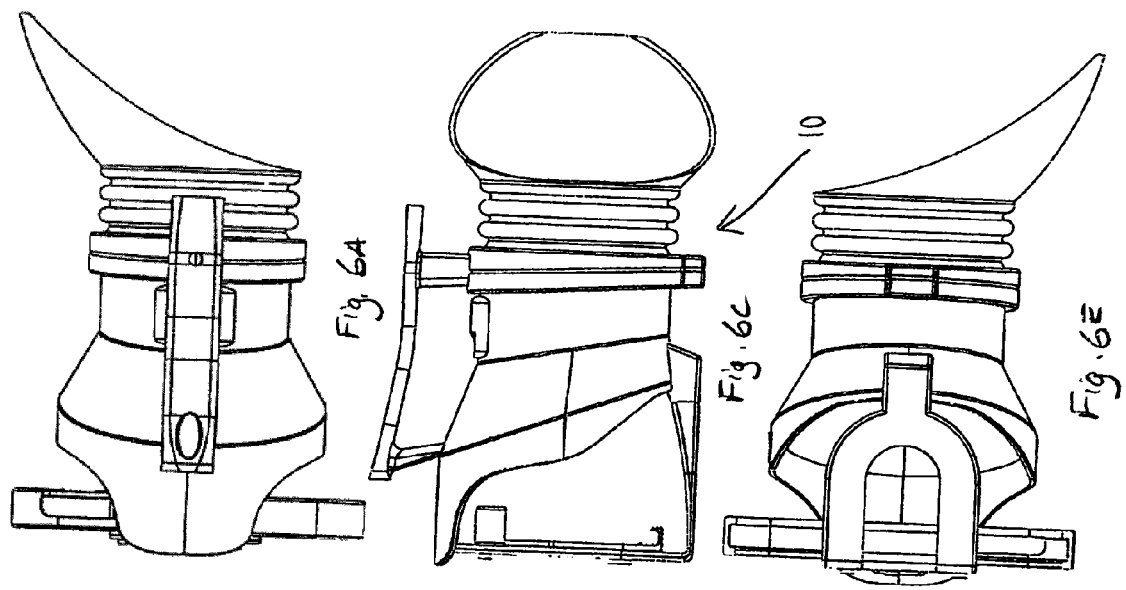
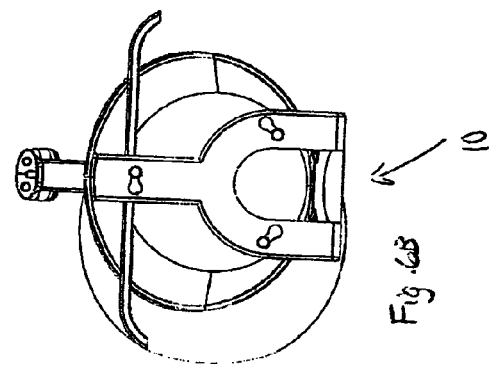

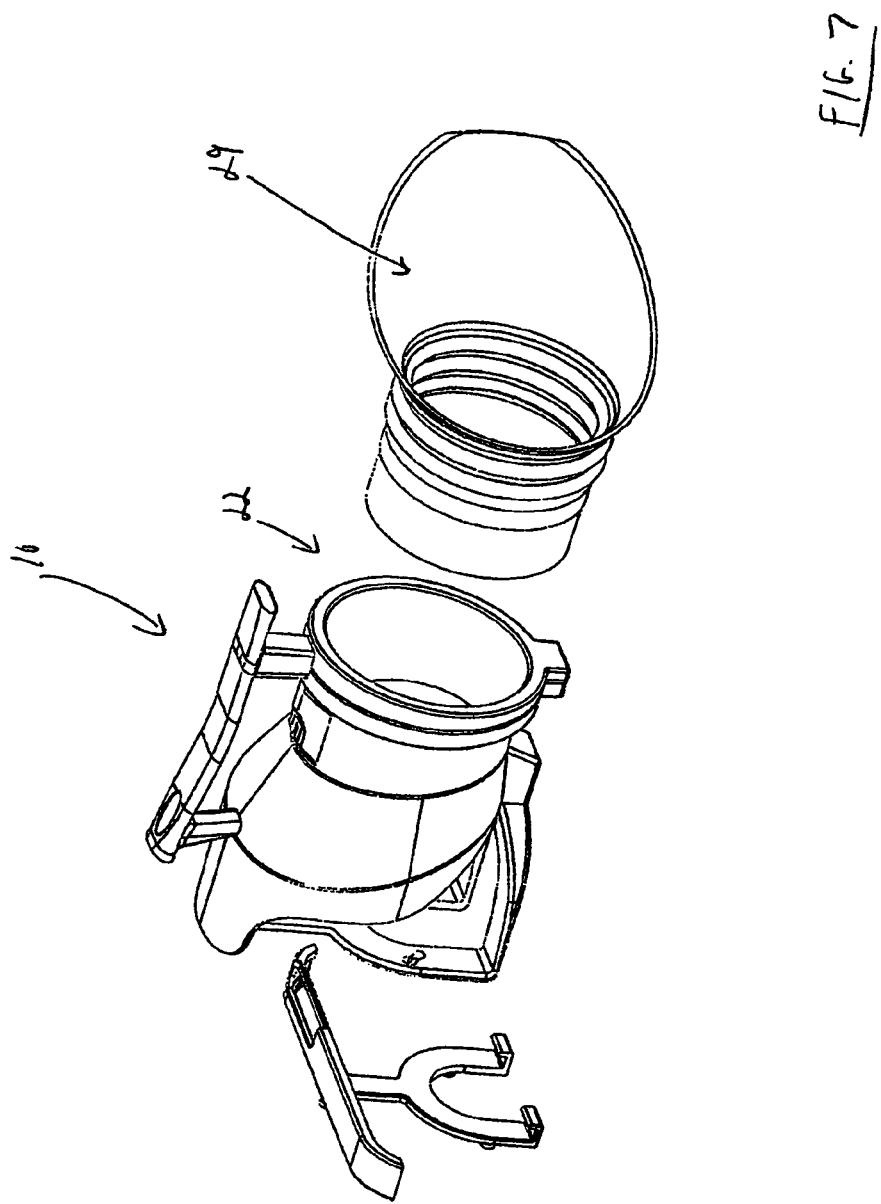

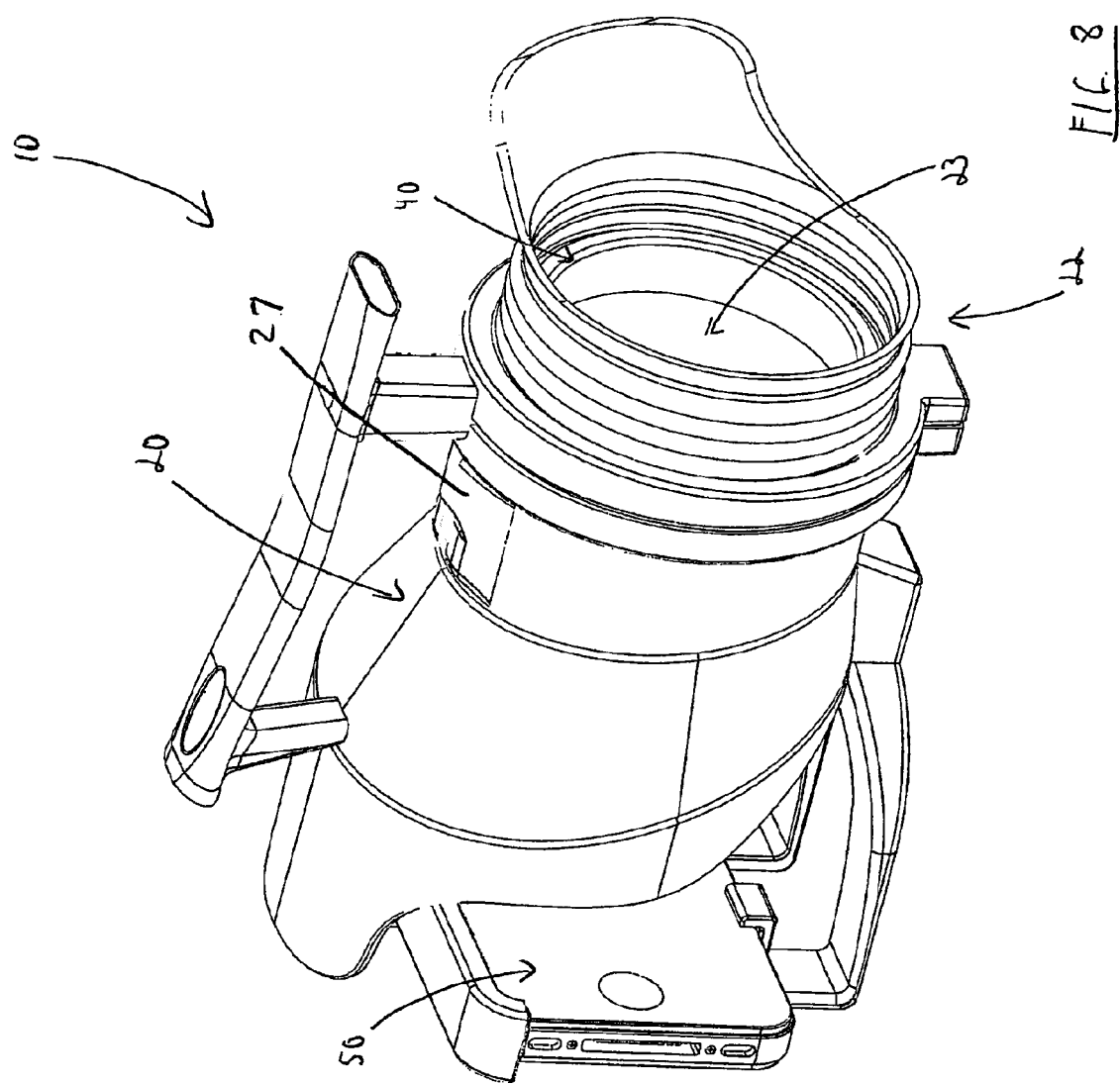

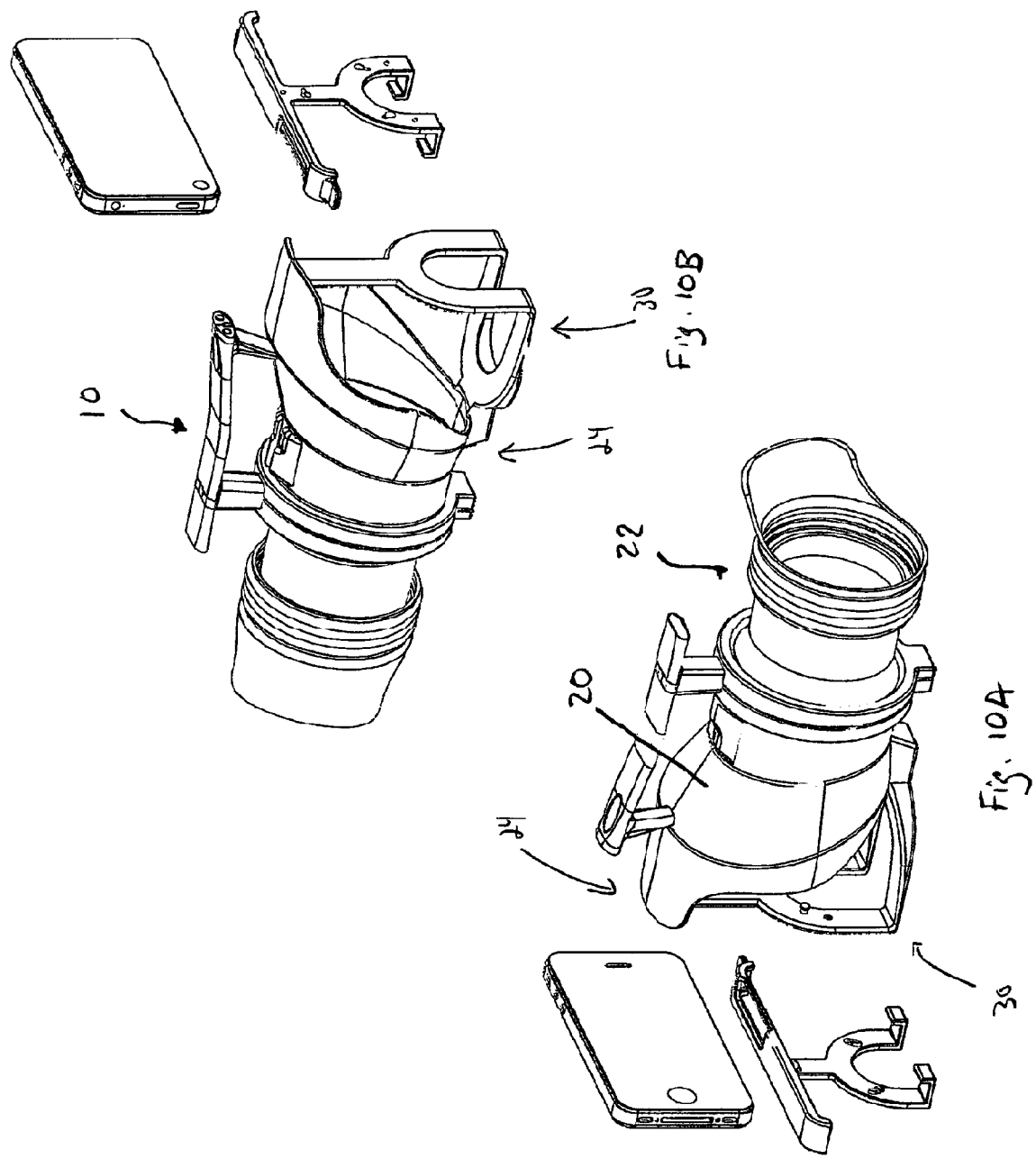

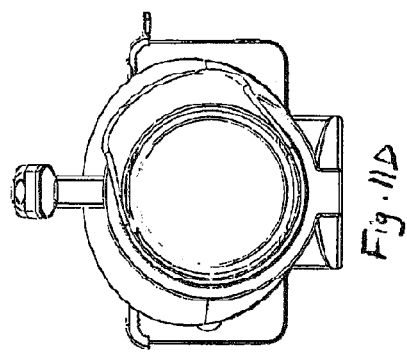
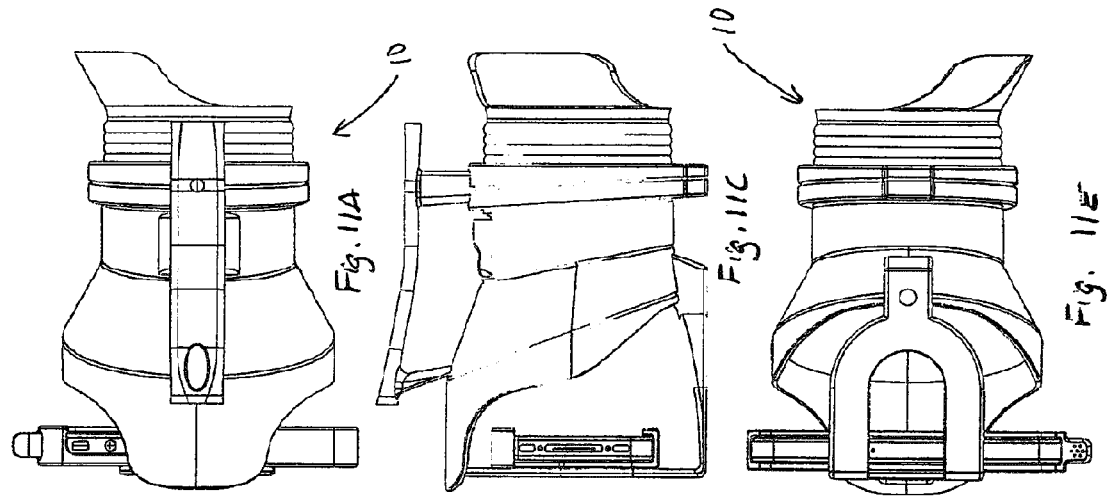
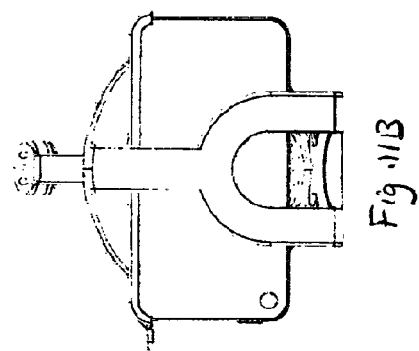

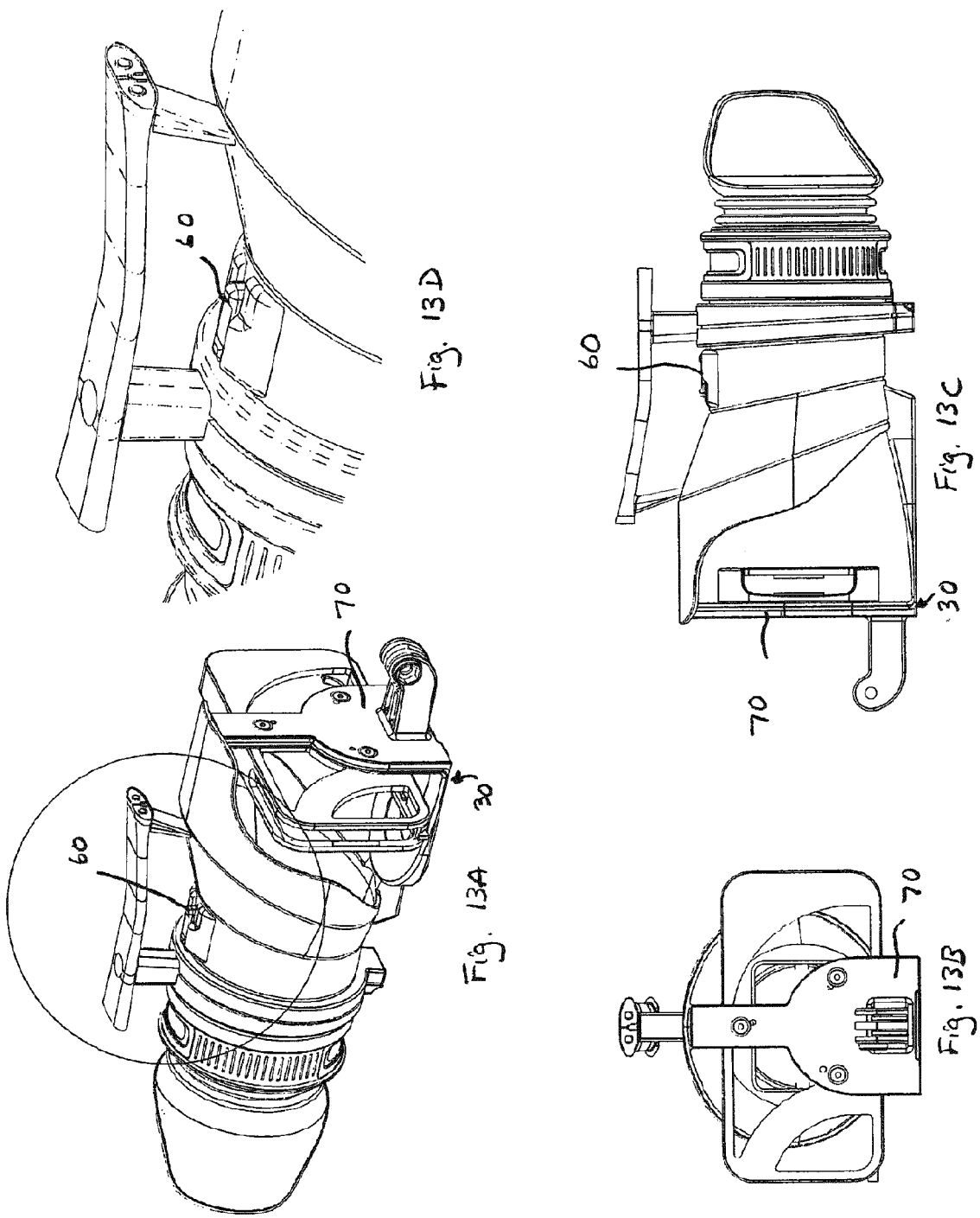

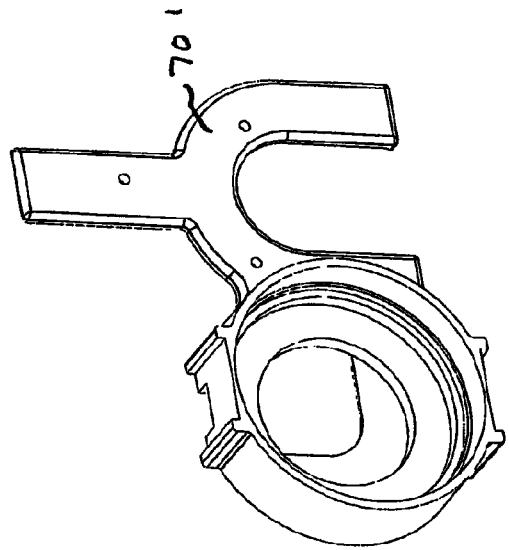
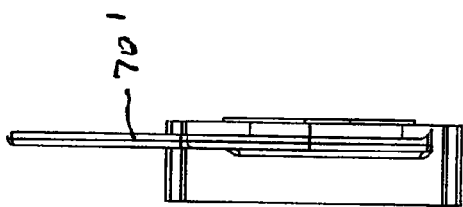
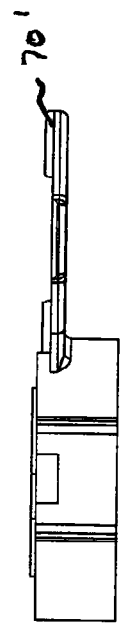
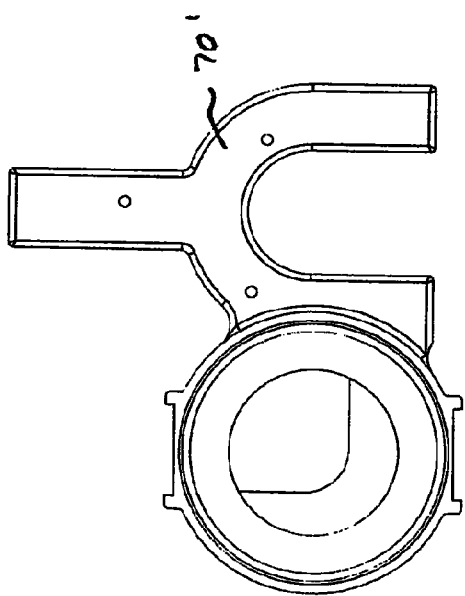
Fig. 15A
Fig. 15B
Fig. 15C
Fig. 15D

HOLDER FOR A MOBILE DEVICE TO CAPTURE IMAGES

FIELD OF THE INVENTION

The present invention relates to a holder for a mobile device. More particularly, the present invention relates to a holder for supporting and maintaining a mobile device substantially steady so as to capture images, for example.

BACKGROUND

The picture-taking and video capabilities of mobile devices such as mobile phones, digital pads, digital cameras, GPS, eye-glass cameras and a host of other mobile devices has improved significantly in recent years.

Indeed, it is now common for such mobile devices to be used, by lay people and professionals alike, to take photographs or shoot videos. The portability and ubiquity of such mobile devices allows these photographers and videographers to capture images and video while performing many different activities, in many different fields. However, the use of such devices for capturing images and video is not always suitable, and can have the following drawbacks: a) the mobile device is small and its focus is thus easily perturbed; b) the screen of the mobile device is often exposed to light and difficult to view; c) the strength required of the arm to hold the mobile device to shoot long videos, for example, can be too much for some users and cause fatigue; d) it is difficult to maintain the mobile device and operate it with one hand, among other drawbacks.

The following documents in the field are known: U.S. Pat. No. 817,207; U.S. Pat. No. 2,369,829; U.S. Pat. No. 2,651,981; U.S. Pat. No. 3,966,101; U.S. Pat. No. 4,244,500; U.S. Pat. No. 4,963,904; U.S. Pat. No. 5,073,788; U.S. Pat. No. 5,397,041; U.S. Pat. No. 6,929,409 B2; U.S. Pat. No. 8,303,123 B2; and EP 1102945 B1.

Hence, in light of the aforementioned, there is a need for a device which, by virtue of its design and components, would be able to overcome or at least minimize some of the aforementioned prior art problems.

SUMMARY

One object of the present invention is to provide a solution to the above-mentioned need.

According to one aspect of the present invention, there is provided a holder for maintaining a mobile device having a screen in a fixed position when used by a user to at least one of capture and view images, the holder comprising:

an elongated hollow cover section for being held by a hand of the user, the cover section comprising a viewer end and an opposed device end, the viewer end being configured for being held near an eye of the user so as to permit the user to view the screen of the mobile device therethrough; and a mobile device support section for supporting the mobile device, the support section being mounted adjacent to the device end of the cover section, the support section being positioned, shaped, and sized for maintaining the mobile device in the fixed position such that the user can stably view the screen of the mobile device through the view end of the cover section, thereby allowing the user to capture images.

In some optional embodiments, the viewer end comprises a single viewing aperture shaped to be held proximate a single eye of the user.

In some optional embodiments, the cover section is substantially cylindrically shaped, extending between the viewer end and the device end, and shaped to be held by a single hand of the user.

Further optionally, the cover section can include a shading element mounted about at least one of the device end of the cover section and the mobile device support section f for shading the screen of the mobile device.

The cover section can also have a handle mounted to at least one of the cover section and the mobile device support section so as to facilitate transport or retention in place of the holder by the user.

Optionally, an eye-protector/shade can be mounted to the viewer end of the cover section so as to shield the user's eye from light, and allow the user to better focus on the screen of the mobile device. The eye-protector/shade can also increase the stability of the images being shot since it allows the entire body of the user to contribute to the stability of the device, as the eye-protector provides a triangular body position that is well-known in the industry and which allows the cameraman (user) to effectively use his/her body as a human tripod.

Further optionally, at least one of the cover section and the mobile device support section can include a trigger element such as a trigger and/or button which can be activated by the user to control the screen and/or mobile device. Similarly, the cover section can include a cable retention assembly for retaining the cables (i.e. earphones, etc.) attached to the mobile device.

In some optional embodiments, the mobile device support section can consist of a pair of substantially horizontal prongs which extend from the viewer end of the cover section.

Optionally, the prongs can be joined to a vertical member, which extends substantially vertically and perpendicularly from the end of the prongs.

Optionally, the vertical member can consist of two legs upon which can be fitted a mount for the mobile device.

Optionally, the mount for the mobile device can receive and secure in position any mobile device (e.g. mobile phone, pad, e-book, camera, GPS, etc.), in any suitable orientation.

Optionally, the mount can include two grips for gripping and supporting the bottom of the mobile device. In other embodiments, the mount can include four grips made to accommodate different types of mobile devices and to avoid blocking the buttons of those devices, as the grips can be made movable with respect to different components of the mobile device.

Optionally, a wireless controller interface can be provided and mounted on at least one the cover section and the mobile device support section, interfacing with a wireless controller, the controller configured to wirelessly control the mobile device. In some embodiments, the wireless control interface can be made integral to the holder and control buttons can also be placed in different areas of the holder to facilitate access and maneuverability while filming or photographing. These buttons can be located in positions similar to those in regular professional cameras so that the user can also use his second hand to activate various device functions or accessories.

Optionally, the holder can further include a secondary device mount mounted on the mobile device support section, the secondary device mount being removably connectable to a secondary device interfacing with the mobile device.

In some implementations, the secondary device mount is removably mounted on the mobile device support section.

In some implementations, the secondary device mount is removably mounted on the vertical member of the mobile device support section.

According to another aspect of the present invention, there is also provided a kit with components for assembling the above-mentioned holder.

According to yet another aspect of the present invention, there is also provided a set of components for interchanging with components of the above-mentioned kit.

According to yet another aspect of the present invention, there is also provided a method of assembling components of the above-mentioned holder, kit and/or set.

According to yet another aspect of the present invention, there is also provided a method of operating the above-mentioned holder, kit and/or set.

According to yet another aspect of the present invention, there is also provided a method of doing business with the above-mentioned holder, kit, set and/or method.

Some objects, advantages and other features will become more apparent upon reading the following non-restrictive description of certain optional embodiments, given for the purpose of exemplification only, with reference to the accompanying drawings.

BRIEF DESCRIPTION OF THE DRAWINGS

FIGS. 6A to 6E provide top, rear, side, front and bottom views respectively of the holder of FIG. 4.

FIG. 7 provides a perspective exploded view of a holder being provided with an eye shade, according to another optional embodiment of the present invention.

FIG. 8 provides a front perspective view of a holder being shown with a mobile device, according to another optional embodiment of the present invention.

FIGS. 10A and 10B provide front and rear perspective exploded views respectively of holders being provided with removably mountable support sections, according to another optional embodiment of the present invention.

FIGS. 11A to 11E provide top, rear, side, front and bottom views respectively of the holder of FIG. 8.

FIGS. 13A to 13D provide perspective, rear, side and detailed views respectively of a holder, according to another optional embodiment of the present invention.

FIGS. 15A to 15D provide perspective, top, front and side views respectively of a secondary device mount, according to another optional embodiment of the present invention.

DETAILED DESCRIPTION OF OPTIONAL EMBODIMENTS

Figure 1:
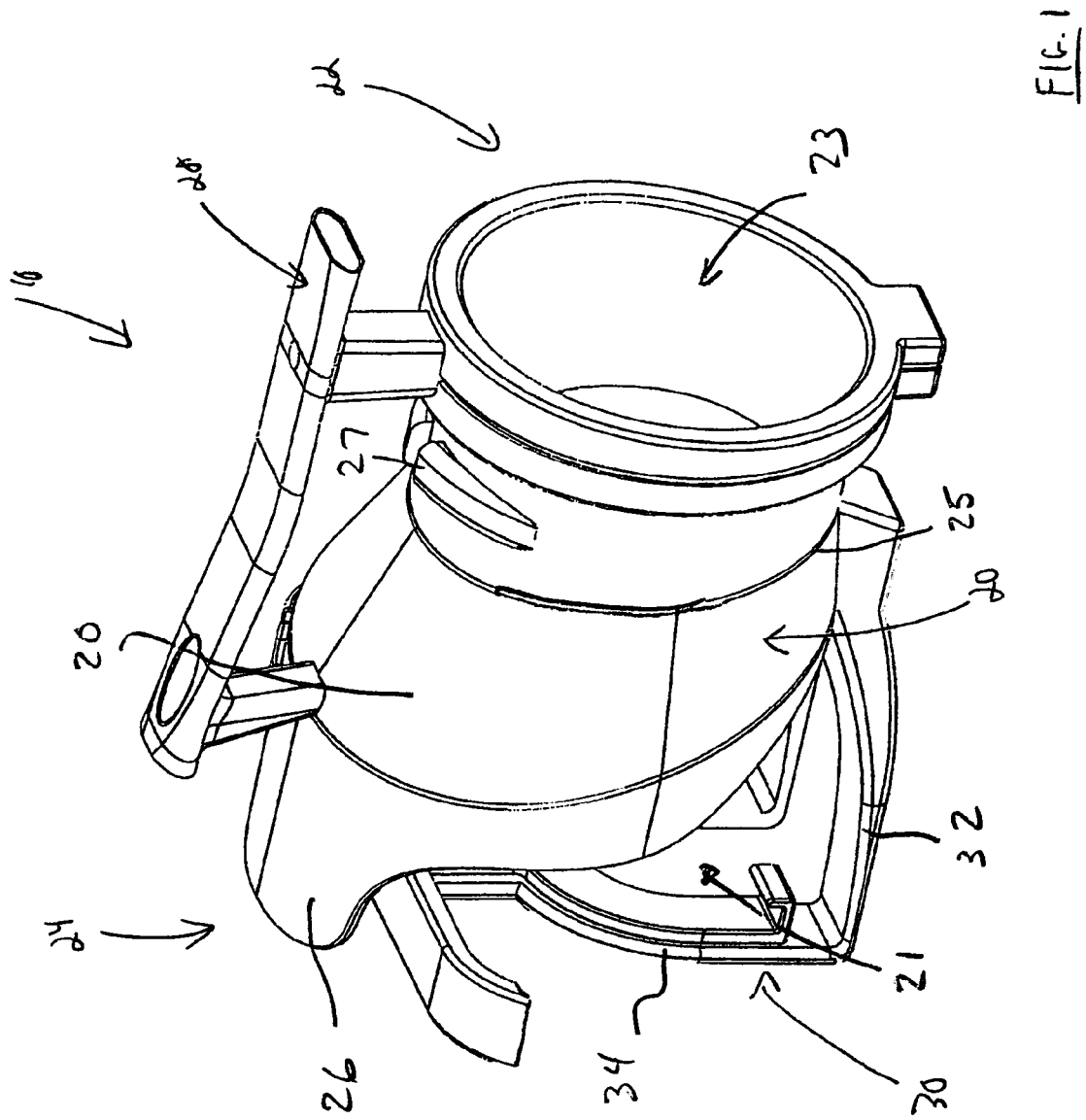
FIG. 1 provides a front perspective view of a holder being shown with a handle, a shade, and a trigger, according to an optional embodiment of the present invention.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only. Moreover, in the context of the present disclosure, the expression "at least one of X and Y" is meant to correspond to "X and/or Y".

Furthermore, although the holder may be used for capturing images (i.e. stills, photos, videos, etc.), for example, it is understood that it may be used with other materials, for other purposes, and with other systems. For this reason, expressions such as "camera", "picture", "video", "image", etc. as used herein should not be taken as to limit the scope of the present invention to being used to only capture images. These expressions encompass all other kinds of materials, objects and/or purposes with which the present invention could be used and may be useful.

In addition, although the optional configurations as illustrated in the accompanying drawings comprise various components and although the optional configurations of the holder as shown may consist of certain geometrical configurations and/or dimensions as explained and illustrated herein, not all of these components, geometries and/or dimensions are essential and thus should not be taken in their restrictive sense, i.e. should not be taken as to limit the scope of the present disclosure. It is to be understood that other suitable components and cooperations thereinbetween, as well as other suitable geometrical configurations and/or dimensions may be used for the holder, and corresponding parts, as briefly explained and as can be easily inferred herefrom, without departing from the scope of the disclosure.

LIST OF ALPHANUMERICAL REFERENCES FOR SOME OF THE CORRESPONDING OPTIONAL COMPONENTS ILLUSTRATED IN THE ACCOMPANYING DRAWINGS 10. holder
20. cover section
21. access zone
22. viewer end
23. aperture
24. device end
25. cable retention assembly
26. shading element
27. trigger element
28. handle
29. eye shade
30. mobile device support section 32. horizontal prong
34. vertical member
36. leg (of vertical member 34)
38. mount
39. grip (of mount 38)
40. lens
50. mobile device Broadly stated, the present invention allows a user to hold a mobile device and/or the camera thereof so as to maintain the mobile device steady in the user's hand, and this, without significantly fatiguing the user's hand and/or arm. In so doing, the user is advantageously able to capture images and/or video while always remaining steady, thereby improving the quality of the captured images. The user can also review images and/or video on the mobile device.

According to one aspect of the present invention, there is provided a holder 10, an example of which is provided in FIGS. 1 to 3 and 12, for maintaining a mobile device having a screen in a fixed position when the holder 10 is used by a hand of a user to capture images. The expression "mobile device" refers to a relatively small, hand-held computing device which has a display screen which may be interactive or not. The mobile device is not limited to a single integral unit, and can also include, for example, a screen or a secondary device mounted to the holder 10 and having a separate miniature camera which can be connected to the screen via a cable, or a wireless connection, and controlled therefrom. Some non-limiting examples of mobile devices include mobile phones, cellular phones, hand-held GPS, personal digital assistance, pads, laptop computers, miniature cameras found in eye-glass cameras, etc. The holder 10 "maintains" (i.e. upholds, supports, retains, sustains, etc.) the mobile device in a particular position and orientation so as to facilitate the capturing of images by the user. In a typical example of a use of the holder 10, the user will mount the mobile device to the holder 10. Such mounting allows the user to employ one or both of his hands to grasp the holder 10, which provides a stable platform which can help the user capture images. The expression "capture and view images" refers to the use of the holder 10 and/or mobile device to take, register, process, etc. any representation or likeness of a person or object, in any medium. As such, the expression includes the recording of moving pictures (i.e. video), the taking of photographs, the registering of data or other visual information, as well the reviewing of such data or other visual information previously stored or displayed on the mobile device.

The holder 10 has an elongated hollow cover section 20 which can be held by the user's hand. The term "elongated" designates the relatively lengthened configuration of the cover section 20, in comparison to its width or height. The cover section 20 is not limited to a straight extension, however, and can take any suitable form. In one possible embodiment, an example of which is provided in FIGS. 1 to 3, the cover section 10 can extend at a fixed diameter for a certain length, and then "expand" so as to extend along the remaining length at a greater diameter, for example. Such an elongated cover section 20 may advantageously provide a more comfortable and/or ergonomic grip for the user's hand. It can also be advantageously held through a single hand The cover section 20 is also hollow, which allows light to traverse the cover section 20 from one end to the other, and which also allows for the user to view through the cover section 20. The cover section 20 is the part of the holder 10 which is held by the hand of the user, and thus provides the support required to reliably and steadily capture images. As such, the cover section 20 can take any suitable shape or configuration which is ergonomic and/or comfortable when held. For example, in some optional embodiments, the cover section 20 is a hollow cylinder or tube.

The cover section 20 has a viewer end 22 for placing near the eye of the user, and providing a view point through which he can look through. The cover section 20 also has a device end 24, which is opposed to the viewer end 22 (i.e. on the opposite side of the cover section 20), and which is in proximity to the mobile device when it is placed within the holder 10. The viewer end 22 is configured for being held near an eye of the user when he is capturing images. The viewer end 22 can include an aperture 23 through which the mobile device can be viewed when the viewer end 22 is brought near the eye of the user.

Preferably, the viewer end 22 includes a single viewing aperture 23 shaped to be held proximate a single eye of the user.

In some optional embodiments, an example of which is provided in FIGS. 8 to 11, the aperture 23 can include a lens 40, or a plurality of lenses 40, which traverses the aperture 23, and which can allow the user to adjust the focus and/or amount of light so as to better view the screen and/or the mobile device 50. Optionally, the lens 40 can be moved along the direction of the extruded cover section 20, toward and/or away from the viewer end 22. Alternatively, a part of the cover section 20, such as a viewfinder, for example, can move back and forward so that the user can adjust their eye as required, and amplify or decrease the field of vision. This can advantageously increase or decrease the field of vision, as required, and allow the holder 10 to be used with mobile devices 50 of varying sizes and configurations (e.g. mobile phones, cellular phones, pads, etc.). Such a viewfinder can be attached to the viewer end 22 of the cover section 20, and removed therefrom when desired, as exemplified in FIG. 10A. In some optional embodiments, the cover section 20 can include a magnifying glass and/or lens 40 for allowing the user to better view the details of the image on the screen and/or mobile device 50, for example, through the viewer end 22.

Figure 2:
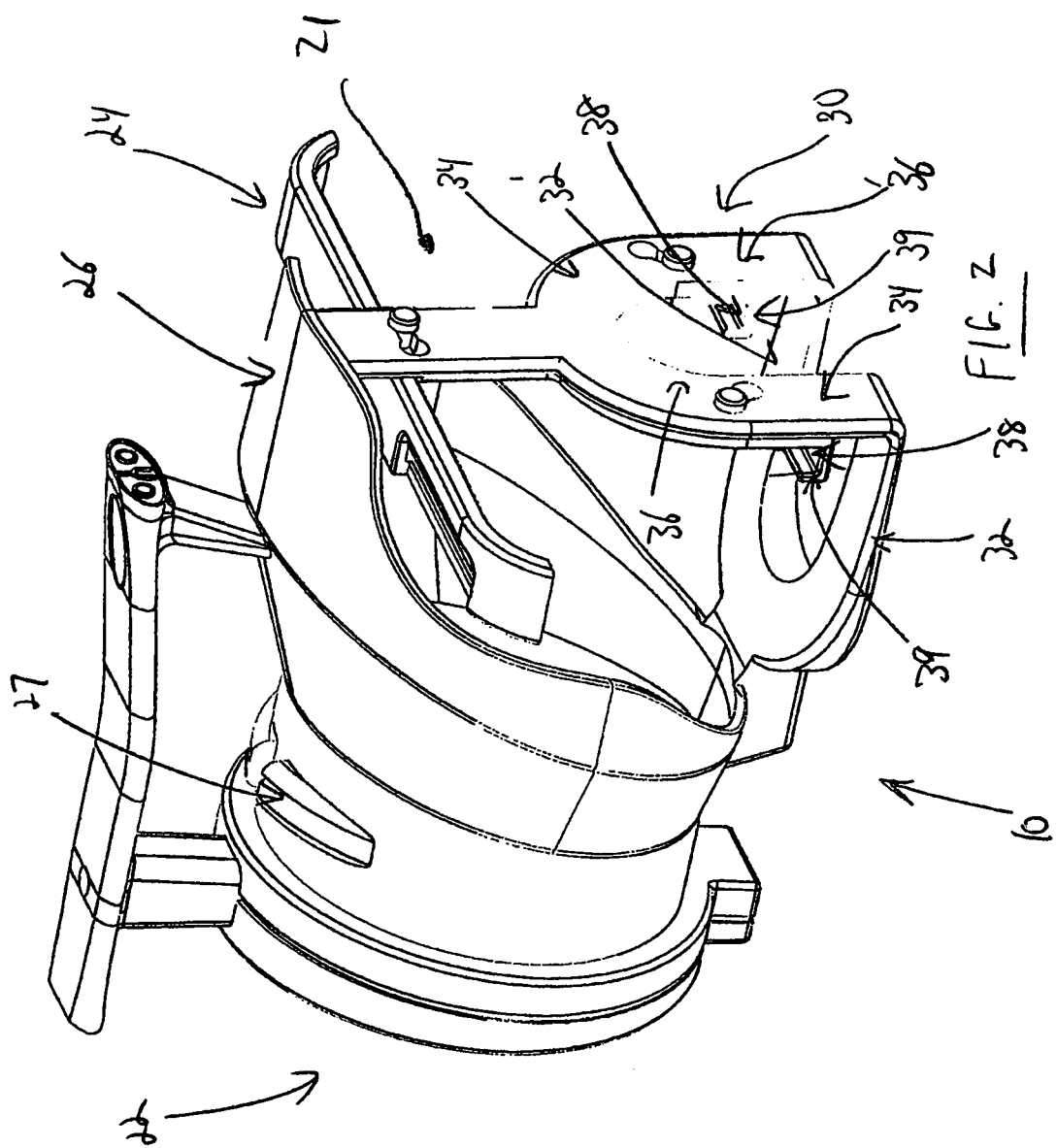
FIG. 2 provides a rear perspective view of the holder of FIG. 1.
Figure 3:
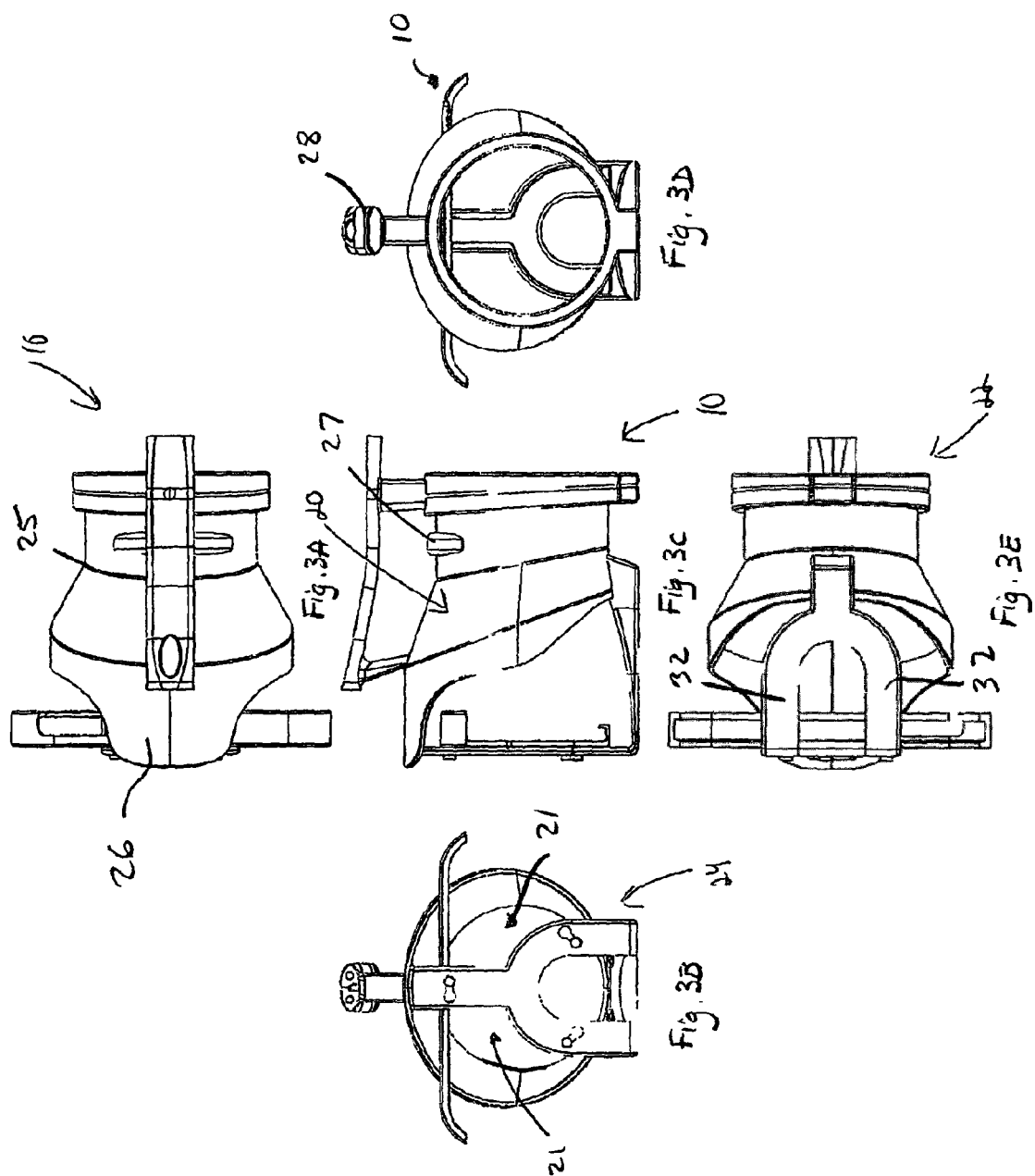
FIGS. 3A to 3E provide top, rear, side, front and bottom views respectively of the holder of FIG. 1.
Figure 4:
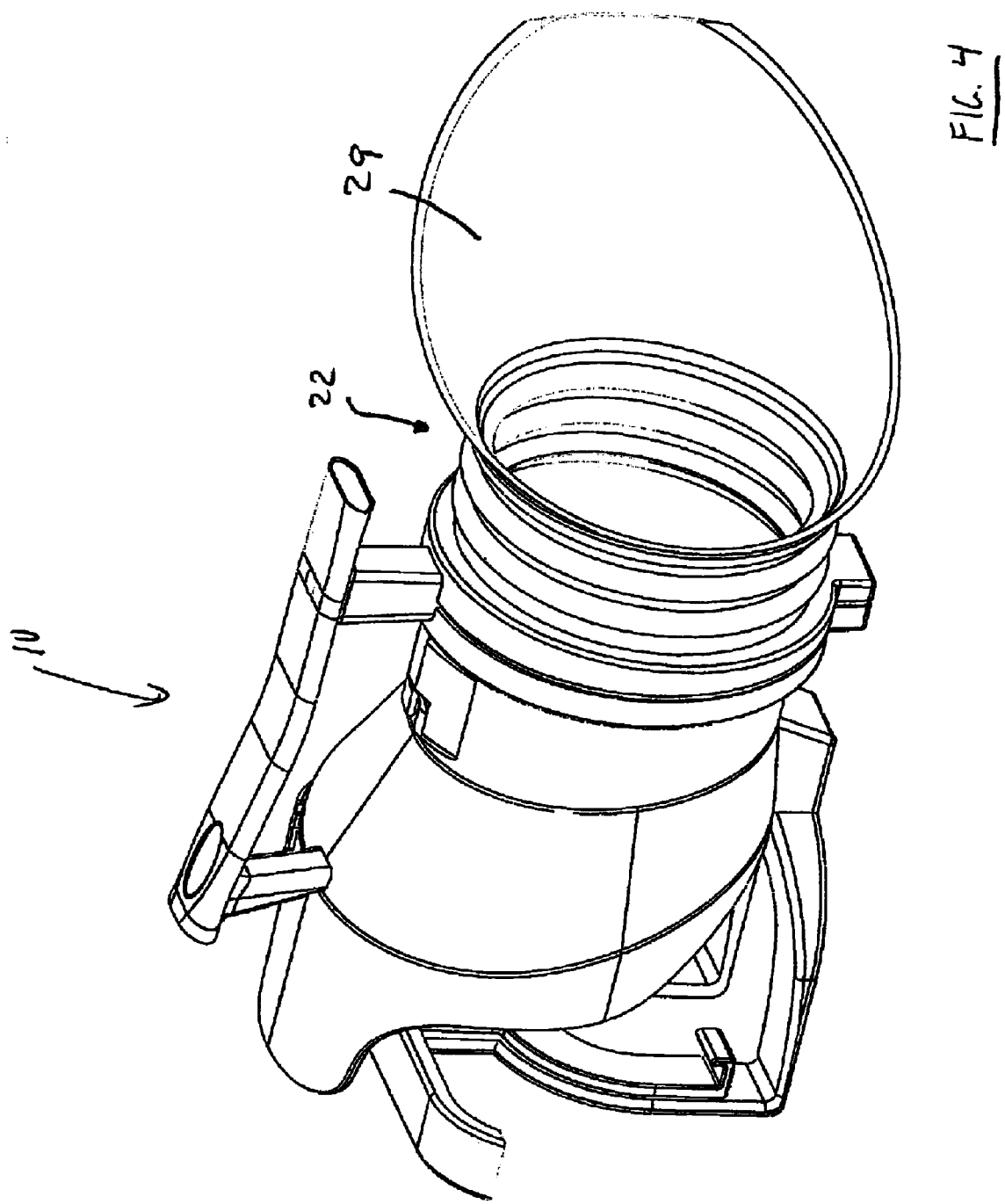
FIG. 4 provides a front perspective view of a holder being shown with an elongated cover section, a handle, an eye shade/eye support device, and another trigger, according to another optional embodiment of the present invention.
Figure 5:
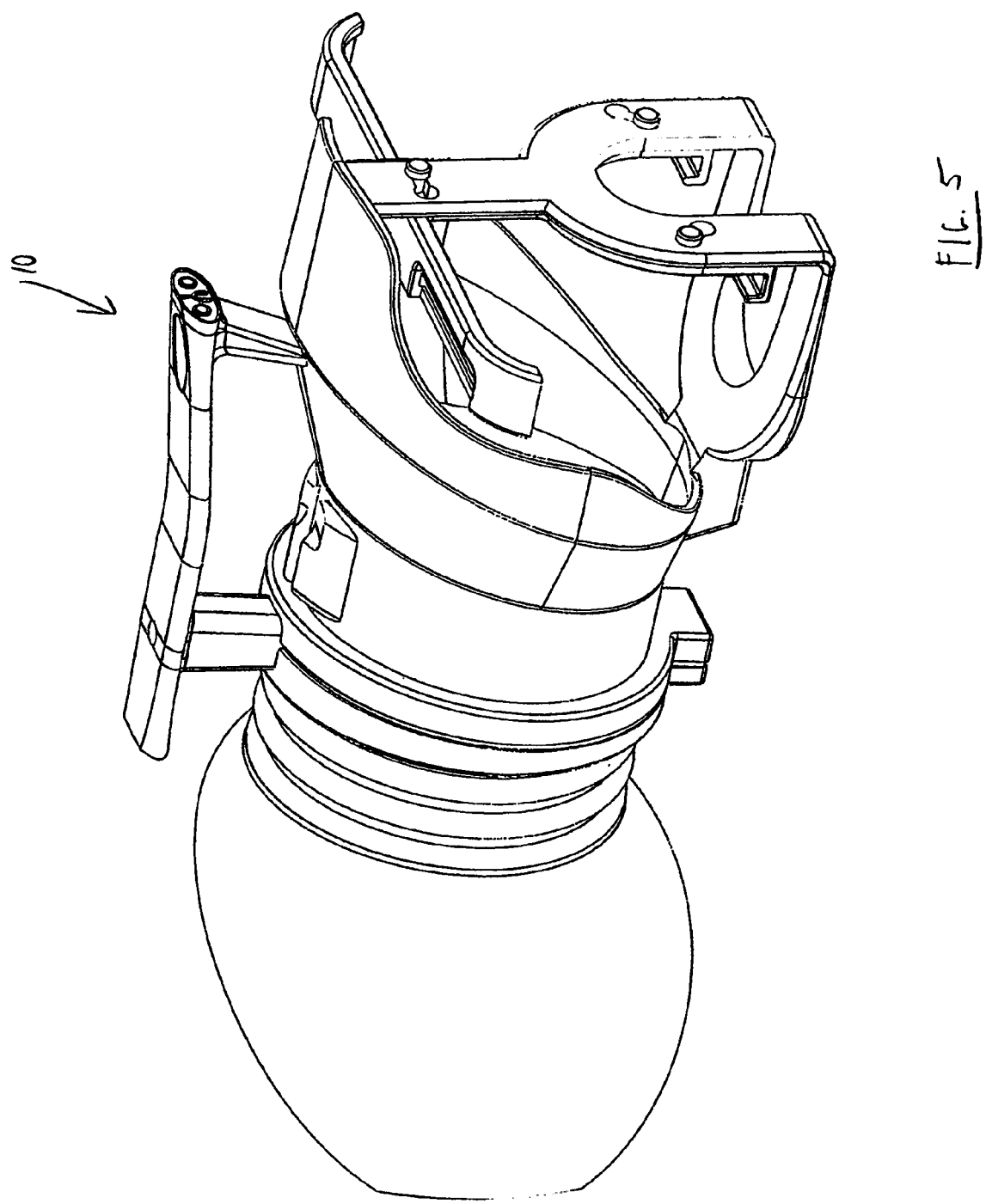
FIG. 5 provides a rear perspective view of the holder of FIG. 4.
Figure 9:
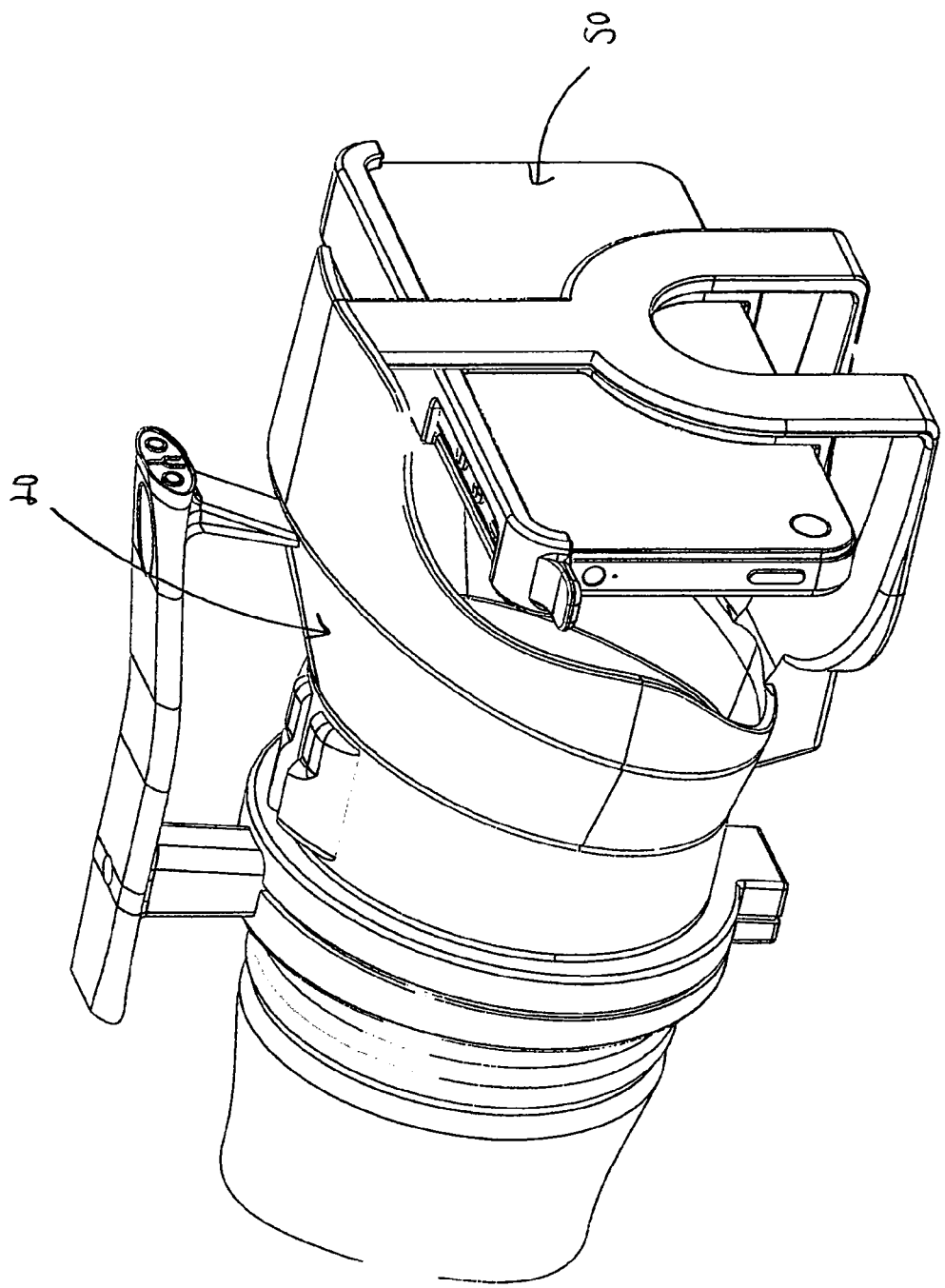
FIG. 9 provides a rear perspective view of the holder of FIG. 8.
Figure 12:
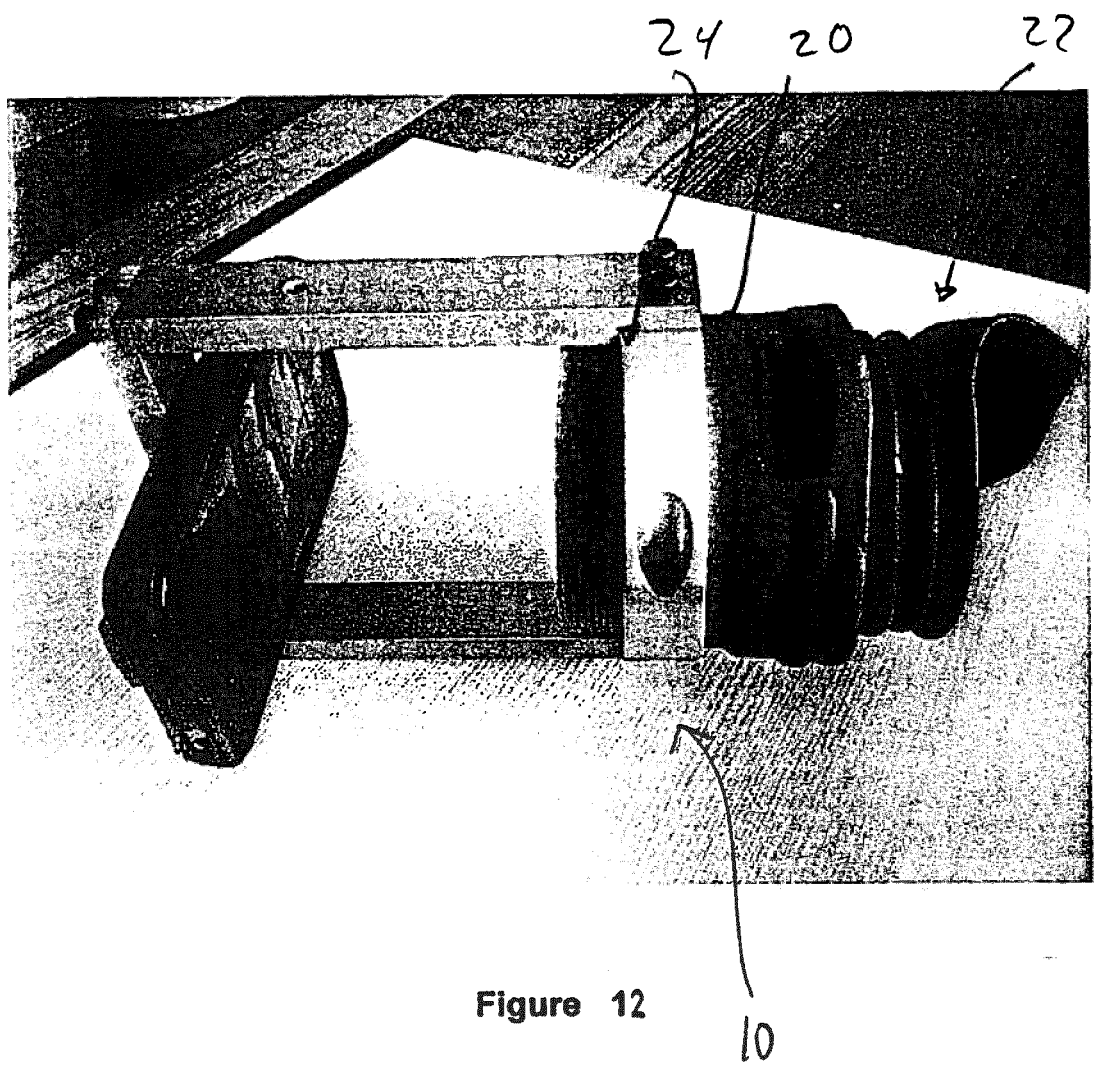
FIG. 12 provides a perspective view of a holder, according to another optional embodiment of the present invention.

In some optional embodiments, the cover section 20 can include a shading element 26 mounted about the device end 24 for shading the screen of the mobile device. The shading element 26 can take any suitable form or configuration provided that it is capable of creating adequate shading and/or reduction of light falling against the screen of the mobile device. In one possible embodiment, an example of which is shown in FIGS. 1 to 3, the shading element 26 is a projection extending from a top surface of the cover section 20, thereby providing an overhang and/or lip for blocking an overhead light source from impinging upon the screen of the mobile device. In some optional embodiments, the shading element can extend along the sides of the cover section 20, becoming progressively less protrusive (and thus, providing less shade) when descending toward the bottom of the cover section 20. Further optionally, the shading element 26 can include one or more access zones 21, which allow the user to insert his fingers into the shaded area provided by the shading element 26 so as to manipulate the screen of the mobile device, for example, and only if desired and/or necessary. In some optional embodiments, the shading element 26 can include an optical lens integral with and/or removeable from, the shading element 26. Such a shading element 26 can be referred to as a "viewfinder".

In some optional embodiments, the cover section 20 can also have a handle 28 mounted to the cover section 20 so as to facilitate transport of the holder 10 by the user. Although exemplified in FIGS. 1 to 3 as being mounted to the top of the cover section 20, the handle 28 can be mounted to any suitable side and/or portion of the cover section 20 (i.e. left, right, bottom, front, end, etc.), or even on part of the mobile device support section. Optionally, the handle 28 can project from the top of the cover section 20, or any other side of the cover section 20, provided that it allows for the user to carry the holder 10 when not in use. Such a projecting handle 28 may therefore form a finger passage between the grip of the handle 28 and the top of the cover section 20, allowing the user to insert his fingers therethrough when gripping the holder 10. As with the cover section 20 itself and/or its outer portions, the handle 28 can be ergonomically designed so as to ease the job of supporting the holder 10 by the user. As such, the hand of the user, either the left or right hand, can thus be inserted easily around the outside of the cover section 20 and through the spaced handle 28.

Figure 16B:
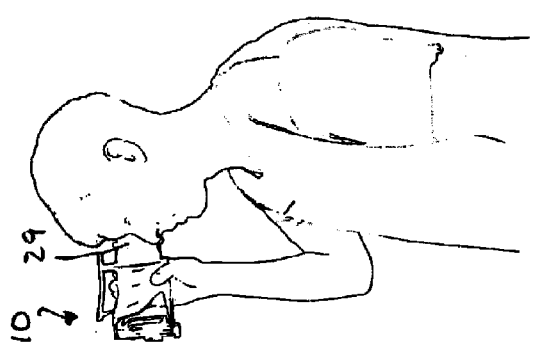
FIGS. 16A to 16C are front and two side views respectively of a holder in use with the secondary device mount shown in FIGS. 15A to 15D, and illustrating how the eyepiece/eye-protector contributes to the overall support of the holder and mobile device, according to another optional embodiment of the present invention.
Figure 16C:
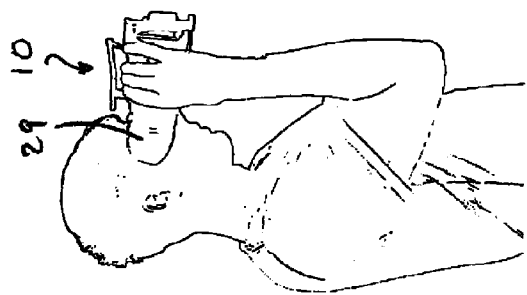
Figure 16A:
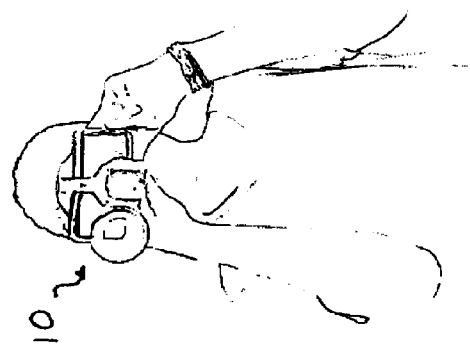

In some optional embodiments, examples of which are provided in FIGS. 4 to 13D, the viewer end 22 includes an eye shade 29 and/or protector. The shade 29 can be mounted to the viewer end 22 so as to provide shading or shielding to the eye of the user looking through the viewer end 22, thereby allowing the user to better focus on the screen of the mobile device. The shade 29 can also be removed from the viewer end 29 when desired, such as when the user wants his eye to be exposed to more light (i.e. at night, for example). The shade 29 can take any suitable configuration, and can be configured for shielding the left and/or right eye of the user. In one example of its use, the user can attach the shade 29 to the viewer end 22 by screwing and/or clipping it to the viewer end 22, and then brining the free end of the shade 29 to one and/or both of his eyes, thereby facilitating the viewing of the mobile device and/or its screen. As better shown in FIGS. 16A to 16C, the eye-protector/shade 29 can also increase the stability of images being shot since it allows the entire body of the user to contribute to the stability of the device, as the eye-protector provides a triangular body position that is well-known in the industry and which allows the cameraman (user) to effectively use his/her body as a human tripod.

Further optionally, the cover section 20 can include a trigger element 27, such as a trigger and/or button. Such a trigger element 27 can be used for many different functions. In one possible embodiment, the trigger element 27 can be used to control the pitch, angle, thickness, etc. of a lens and/or magnifying glass mounted within the cover section 20. In another possible embodiment, the trigger element 27 can be used to activate and/or control the screen and/or mobile device. In such an embodiment, an example of which is provided in FIG. 8, the trigger element 27 can house the earphones or any other suitable cable which can control the camera such that the user can advantageously activate the trigger 27 to capture images without having to touch the mobile device 50. Similarly, the cover section 20 can include a cable retention assembly 25 for the cables (i.e. earphones, etc.) of the mobile device such that the cables do not interfere with the operation of the holder 10 and/or the mobile device. The cable retention assembly 25 can be configured to extend along a periphery of the exterior of the cover section 20 and can consist of a groove indented therein. The cables and/or cords can then be press-fitted or otherwise inserted within the groove, thereby preventing these cables from interfering with the operation of the holder 10 and/or mobile device. For example, where the mobile device is an iPhone™, the iPhone™ trigger 27 can be inserted into the cable retention assembly 25 groove and controlled therefrom.

Returning to FIGS. 1 to 3, the holder 10 also has a mobile device support section 30, which supports the mobile device when inserted, joined, attached, etc. therein, and which maintains the mobile device in position. The support section 30 is mounted adjacent to, or near, the device end 24 of the cover section 20. The support section 30 can be mounted, and removed, from the device end 24, can be adjustable in height, length, width, etc. so as to adapt to mobile devices of different sizes and configurations, as exemplified in FIGS. 10A and 10B. Upon insertion of the mobile device within the support section 30, the mobile device is centered, positioned, configured, etc. so that it is in proper alignment with the gaze of the user when looking through the viewer end 22. The support section 30 is configured for maintaining the mobile device in a fixed position. As such, the support section 30 can have many possible configurations, some examples of which are described below.

In some optional embodiments, as better shown in FIG. 2, the mobile device support section 30 can have one or many substantially horizontal prongs 32. The prongs 32 can project from the device end 24 of the cover section 20 in a direction substantially similar to the direction of elongation of the cover section 20. The prongs 32 can extend in a substantially horizontal fashion (i.e. parallel to the ground), and can be positioned beneath the location where the mobile device is maintained. Such a positioning of the horizontal prongs 32 can advantageously allow for the prongs 32 to help in catching the mobile device should it dislodge itself from the support section 30, thus preventing the mobile device from being damaged by impacting the ground. The prongs 32 can be made of any suitable material so as to support the mobile device against the forces generated by its own weight and by its movement with the holder 10 (i.e. during filming, for example). In another possible embodiment, the prongs 32 can extend substantially horizontally from the top of the cover section 20 so as to support the mobile device from above. It is thus apparent that the prongs 32 can have many possible configurations and orientations, all of which fall within the scope of the present disclosure.

In some optional embodiments, the prongs 32 can extend substantially horizontally, and be connected at their ends to vertical members 34. The members 34 can extend substantially vertically from the end of the prongs 32 or from any other suitable portion of the prongs 32, and thus run upward toward the top of the cover section 20. In so doing, the members 34 can advantageously provide a backing for the screen and/or mobile device when mounted within the support section 30. The members 34 can be oriented such that the screen of the mobile device is angled a certain amount, which can facilitate viewing by the user through the viewer end 22.

In some optional embodiments, examples of which are provided in FIGS. 1 to 3, the vertical members 34 extend vertically from the ends of the prongs 32 and merge to form a substantially "T"-shaped junction. The top of the T-junction can be vertically and/or horizontally adjusted, and can support the upper portion of the mobile device when inserted therein, thereby advantageously providing additional stability. In other optional embodiments, the vertical members 34 can be provided with legs 36 which run vertically and which can connect together at a curve to form an integral member.

In some optional embodiments, the support section 30 can also have a mount 38 into which the bottom of the mobile device can be inserted and/or rest. The mount 38 can be any lip, flange, protrusion, etc. which extends from one of the legs 36, for example, inwardly toward the device end 24. Such an extended mount 38 provides a surface into which the bottom of the mobile device can be mounted, and secured. In alternate embodiments, the mount could also include a hook and loop fastener. The "U"-shaped mounts 38 can thus provide support against any tendency of the mobile device to pivot and/or rotate about its bottom portion, further contributing to the stability of the mobile device within the support section 30. The mounts 38 can be adjusted vertically or horizontally so that the support section 30 can be adapted to a mobile device of any size or orientation. Further optionally, the bottom of the U-shaped mounts 38 can include grips 39, which can be surfaces which increase the frictional contact between the mounts 38 and the mobile device, thereby providing further support to the mounting device. In other embodiments, the holder further comprises attachments for attaching the holder to other objects, like helmets or bikes. Moreover, the holder can further include a glass or transparent plastic cover or case to make it water proof.

According to another aspect of the invention, there is provided a kit comprising any and/or all of the components of the holder 10 described above, as well as a mobile device.

Indeed, the holder 10 can have the following components and features, for example:
1) Shade cover section and main support section;
2) Front brace;
3) Device hold adapter;
4) Viewfinder;
5) Eye cup/protector/support;
6) Bottom screw adapter;
7) Upper screw adapter;
8) Trigger groove; and
9) Cable channel holder.

As can be appreciated in light of the preceding, the holder 10 offers advantages over the prior art in that, by virtue of its design and components, the holder 10 simultaneously allows for the steadying of a mobile device for capturing images, for example, while still providing full functionality and/or access to the screen of the mobile device.

In addition, the holder 10 provides support, stability and control of mobile devices such as mobile phones, portable photographic and video cameras comfortably at eye level and at arm's length through the use of a viewfinder, eyepiece, an ergonomic handle and an ergonomic shade structure. The holder 10 also can also be configured to hold simultaneously other accessories such as a light, a mobile device remote trigger, a tripod base, etc.

Furthermore, the ergonomic design of the holder 10 can allow the user to grip the holder 10 for long periods of time without reducing user mobility. It also allows the user to grip the holder 10 in any position with one hand in a very comfortable manner. As a device such as a mobile phone, micro camera, smart glasses, or pocket camera is placed in the holder 10, the load is well balanced on the hand gripping the holder 10, thereby allowing the user to perform smooth and stable movements.

The sleek design of the holder 10 also gives a professional look to the user when using it. The design of the holder 10 can also camouflage the fact that the user is filming or photographing with a mobile device.

It can thus be appreciated that the holder 10 helps to solve a very important problem for people who want to use devices such as a mobile phone, in that it allows them to shoot video and/or capture images in a very stable manner because it reproduces the comfort and user-friendliness of known support sections which are typically used for more professional cameras. Furthermore, when the user wants to shoot with a mobile device such as mobile phone that looks less professional, the holder 10 allows such a user to acquire a professional appearance because the design of the holder 10 looks high-tech and professional as well. Moreover, the holder further provides functionalities that are provided in professional cameras.

For certain activities such as extreme sports (e.g. rollerblading, skateboarding, parachuting, rock-climbing, etc.), the holder 10 can be very useful because the user can handle it with one single hand at any level of the body and almost in any position without compromising the user's ability to continue with his activity. Furthermore, the holder 10 can allow accessories such as wide angle lenses to be used with the mobile device used to capture images, and can also allow for the mounting of an external screen and/or LCD monitor on top of the handle.

In some implementations, as shown in FIGS. 13A to 13C, a wireless controller interface 60 can be provided and mounted on the cover section, interfacing with a wireless controller, the controller being configured to wirelessly control the mobile device. Hence, an electronic "Command Centre" can be attached to the holder such that it allows the user to remotely control some functions of the mobile device such as, but not limited to, zoom, focus, trigger, exposure, aperture, speed, etc., through a wireless interface.

In some implementations, as mentioned above, the holder 10 can also allow other accessories or secondary devices to be mounted thereon, More particularly, the holder 10 can further include a secondary device mount 70 mounted on the mobile device support section 30, the secondary device mount 70 being removably connectable to a secondary device interfacing with the mobile device.

Figure 14A:
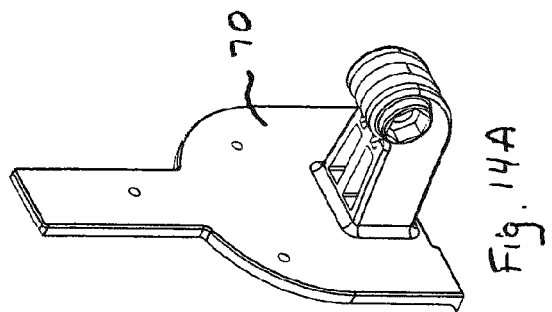
FIGS. 14A to 14D provide perspective, top, front and side views respectively of a secondary device mount, according to an optional embodiment of the present invention.
Figure 14D:
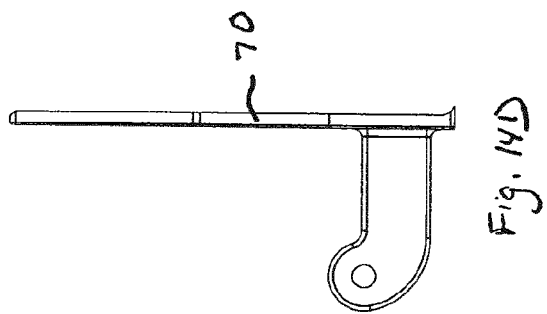
Figure 14B:
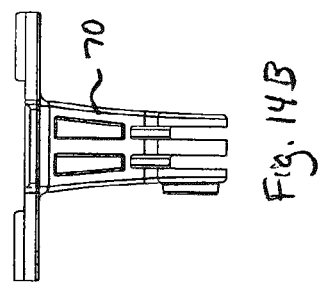
Figure 14C:
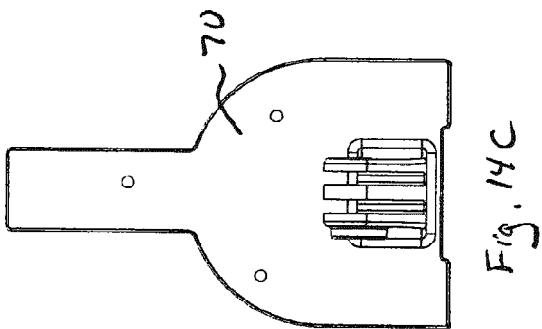

In the implementation shown in FIGS. 13A to 13D, in shown in more detail in FIGS. 14A to 14B, the secondary device mount 70 can be shaped to interface and connect to a Go-Pro™ camera device. In an alternate implementation shown in FIGS. 15A to 15D, the secondary device mount 70' can be shaped to interface and connect to SONY QX™-type camera lens series adaptor. Hence, the holder 10 can effectively serve as a viewfinder hand held body to operate such secondary devices in a more comfortable and professional manner, Of course, the secondary device mount 70 can be shaped to adapt to any other type of secondary device. Moreover, in other embodiments, the holder 10 can further comprise integrated circuits with switches, buttons, or mini-LED screens positioned all around the holder in comfortable places for the user to easily operate the mobile device, The switches, buttons, or mini-LED screens can read data, interact and communicate with the device.

In some implementations, the secondary device mount 70 is removably mounted on the mobile device support section 30.

In some implementations, the secondary device mount 70 is removably mounted on the vertical member of the mobile device support section.

The holder according to the present invention converts a smart phone and many other mobile devices into a professional video/photo camera. The holder effectively becomes a "Smart Body" and control center that controls the imaging sensor which is provided in the mobile device.

Of course, numerous modifications could be made to the above-described configurations without departing from the scope of the disclosure.

The invention claimed is:
1. A holder for maintaining a mobile device having a screen in a fixed position when used by a user to at least one of capture and view images, the holder comprising:

an elongated hollow cover section for being held by a hand of the user, the elongated hollow cover section comprising a viewer end section distal end section positioned opposite the viewer end section, and a longitudinal axis extending through the viewer end section and the distal end section, the viewer end section being configured for being held near at least one eye of the user so as to permit the user to view the screen of the mobile device therethrough; and a mobile device support section for supporting the mobile device, the mobile device support section being mounted adjacent to the distal end section of the elongated hollow cover section, the mobile device support section being positioned, shaped, and sized for maintaining the screen of the mobile device in a plane normal to the longitudinal axis of the elongated hollow cover section when the mobile device is in the screen of the mobile device through the viewer end section of the elongated hollow cover section, wherein the holder enables the user to capture images with the mobile device; and a handle mounted to the elongated hollow cover section, the handle projecting from the elongated hollow cover section and forming a finger passage between the handle and the elongated hollow cover section, wherein the finger passage allows at least one finger of the user to be inserted through the finger passage, thereby allowing the user to capture images, wherein light emanating from the screen of the mobile device is guided from the distal end section towards the viewer end section along the longitudinal axis by the elongated hollow cover section.

2. The holder according to claim 1, wherein the viewer end section comprises a single viewing aperture shaped to be held proximate a single eye of the user.

3. The holder according to claim 2, wherein the cover section is substantially cylindrically shaped, extending between the viewer end section and the distal end section, and shaped to be held by a single hand of the user.

4. The holder according to claim 3, further comprising a shading element mounted about at least one of the distal end section of the cover section and the mobile device support section for shading the screen of the mobile device.

5. The holder according to claim 1, wherein the cover section is substantially cylindrically shaped, extending between the viewer end section and the distal end section, and shaped to be held by a single hand of the user.

6. The holder according to claim 1, further comprising a shading element mounted about at least one of the distal end section of the cover section and the mobile device support section for shading the screen of the mobile device.

7. The holder according to claim 1, further comprising an eye-protector and shade element mounted to the viewer end section of the cover section.

8. The holder according to claim 1, wherein at least one of the cover section and the mobile device support section further comprises a trigger element actuatable by the user to control the screen and/or mobile device.

9. The holder according to claim 1, wherein the cover section further comprises a cable retention assembly retaining cables attached to the mobile device.

10. The holder according to claim 1, wherein the mobile device support section comprises a pair of substantially horizontal prongs extending from the viewer end of the cover section.

11. The holder according to claim 10, wherein the prongs are joined to a vertical member extending substantially vertically and perpendicularly from the end of the prongs.

12. The holder according to claim 11, wherein the vertical member comprises two legs connected to a mount for the mobile device.

13. The holder according to claim 12, wherein the mount comprises two grips gripping and supporting a bottom of the mobile device.

14. The holder according to claim 13, further comprising a secondary device mount removably mounted on the vertical member of the mobile device support section, the secondary device mount being removably connectable to a secondary device interfacing with the mobile device.

15. The holder according to claim 12, further comprising a secondary device mount removably mounted on the vertical member of the mobile device support section, the secondary device mount being removably connectable to a secondary device interfacing with the mobile device.

16. The holder according to claim 11, further comprising a secondary device mount removably mounted on the vertical member of the mobile device support section, the secondary device mount being removably connectable to a secondary device interfacing with the mobile device.

17. The holder according to claim 1, further comprising a wireless controller interface, mounted on at least one of the cover section and the device support section, interfacing with a wireless controller, the controller configured to wirelessly control the mobile device.

18. The holder according to claim 1, further comprising a secondary device mount mounted on the mobile device support section, the secondary device mount being removably connectable to a secondary device interfacing with the mobile device.

19. The holder according to claim 18, wherein the secondary device mount is removably mounted on the mobile device support section.

* * * * *

UNITED STATES PATENT AND TRADEMARK OFFICE
CERTIFICATE OF CORRECTION

PATENT NO. : 10,073,323 B2
APPLICATION NO. : 14/777028
DATED : September 11, 2018
INVENTOR(S) : Enrique Launi Page 1 of 1

It is certified that error appears in the above-identified patent and that said Letters Patent is hereby corrected as shown below:

In the Claims

Column 11, Lines 17-21 (Claim 1), "cover section when the mobile device is in the screen of the mobile device through the viewer end section of the elongated hollow cover section, wherein the holder enables the user to capture images with the mobile device; and" should read "cover section when the mobile device is in the fixed position, such that the user stably and directly views the images provided on the screen of the mobile device through the viewer end section of the elongated hollow cover section, wherein the holder enables the user to capture images with the mobile device; and".

Signed and Sealed this
Fifteenth Day of January, 2019

Andrei Iancu
*Director of the United States Patent and Trademark Office*